June 19, 1962     D. E. TROTT     3,039,790

BICYCLE DRIVEN BY OSCILLATING LEVERS

Filed May 20, 1959     3 Sheets-Sheet 1

INVENTOR
Donald E. Trott

BY

ATTORNEY

INVENTOR
Donald E. Trott

BY

ATTORNEY

June 19, 1962     D. E. TROTT     3,039,790
BICYCLE DRIVEN BY OSCILLATING LEVERS
Filed May 20, 1959     3 Sheets-Sheet 3
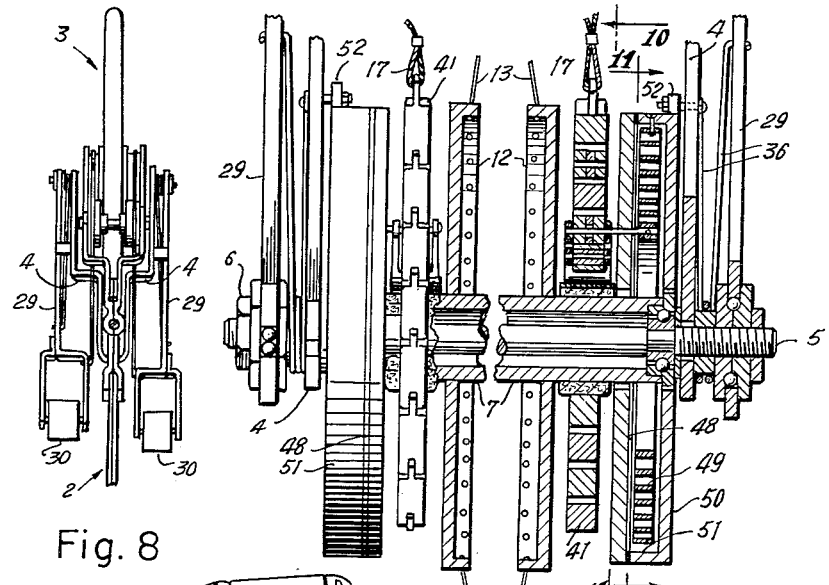
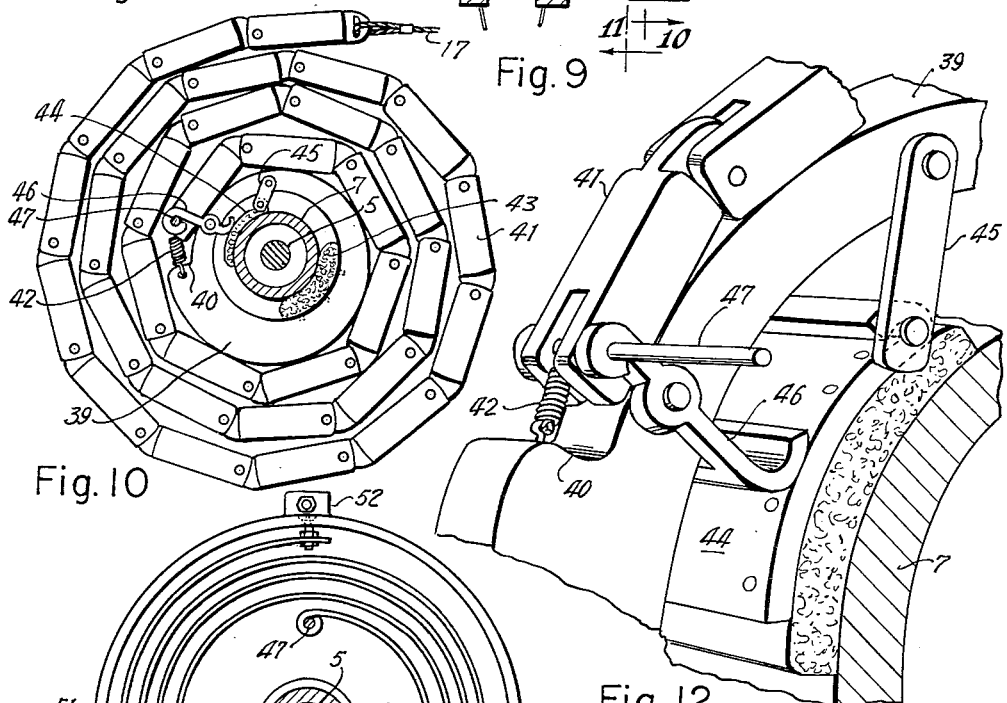
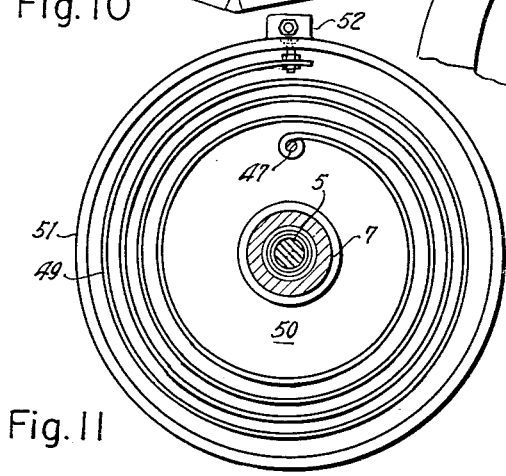
INVENTOR
Donald E. Trott
BY Cecil L. Wood
ATTORNEY

United States Patent Office 3,039,790
Patented June 19, 1962

3,039,790
BICYCLE DRIVEN BY OSCILLATING LEVERS
Donald E. Trott, 3039 New Castle Drive, Dallas, Tex.
Filed May 20, 1959, Ser. No. 814,525
3 Claims. (Cl. 280—251)

This invention relates to a bicycle, and it concerns more particularly a bicycle having improved drive means whereby it is adapted to be propelled, and an improved structure of the frame of the bicycle.

An object of the invention is to provide, in the structure described in a bicycle having a one-piece frame and a driving wheel rotatably mounted on the frame, drive means comprising a pair of foot-operable levers each having one of its ends pivotally connected to the frame and movable pivotally about the axis of rotation of the driving wheel, a pair of rotating drums each aligned axially with the driving wheel, flexible linkage wound on each of the drums and having its free end connected to one of the levers, and clutch means operatively connecting each of the drums to the driving wheel, whereby the wheel is adapted to be turned in a forward direction upon depressing either of the levers.

Another object of the invention is to provide, in the structure described, spring means normally acting on each of the drums to restrain it against rotative movement relative to the frame, the arrangement being such that the flexible linkage is unwound from the drums upon depressing the respective levers, and is rewound thereon, upon releasing the levers, by the action of the spring means.

Another object of the invention is to provide, in the structure described, a pair of pulleys each mounted on the frame above one of the drums, the flexible linkage being strung over the respective pulleys whereby vertical reciprocating motion applied to the free ends of the levers results in rotative movement of the drums.

Another object of the invention is to provide, in the structure described, means limiting pivotal movement of each of the levers in either direction, and spring means normally acting on each of the levers to restrain it against downward pivotal movement relative to the frame, whereby the levers are normally biased in their uppermost positions.

Another object of the invention is to provide a bicycle having drive means in which the longest stroke leverage of least mechanical advantage for speed is obtained when the leg is in its least effective position, thereby causing less fatigue and more power from that portion of the stroke.

Another object of the invention is to provide a bicycle having means in which the stroke leverage or mechanical advantage for speed is gradually increased on each operative pedal stroke as the pedal is depressed downwardly thereby permitting the rider to select any mechanical advantage desired by selecting any portion of the pedal stroke in short or long alternating strokes.

Another object of the invention is to provide a bicycle having drive means operatively connected to the pedals by means designed to overcome the disadvantages of dead centers.

Another object of the invention is to provide a bicycle having drive means which permits alternating short or long operative strokes of the pedals thereby adapting the bicycle for use, without adjustment, by persons having longer legs than others.

Another object of the invention is to provide a bicycle having drive means adapted to vary the speed of the drive wheel relative to the movement of the pedals by selection by the rider of the particular portion of the operative pedal stroke which results in the desired mechanical advantage for the speed desired.

The invention will be readily understood by referring to the following description and the accompanying drawing, in which:

FIGURE 8 is a top plan view of the rear portion of a bicycle embodying the invention in modified form, with the seat thereof removed;

FIGURE 9 is a fragmentary transverse view, on an enlarged scale, partly in section taken on a median line, of the apparatus shown in FIGURE 8;

FIGURE 10 is a sectional elevational view taken on the line 10—10 of FIGURE 9;

FIGURE 11 is a sectional elevational view taken on the line 11—11 of FIGURE 9; and FIGURE 12 is a fragmentary perspective view, on an enlarged scale, of a portion of the apparatus shown in FIGURE 10.

Figure 1:
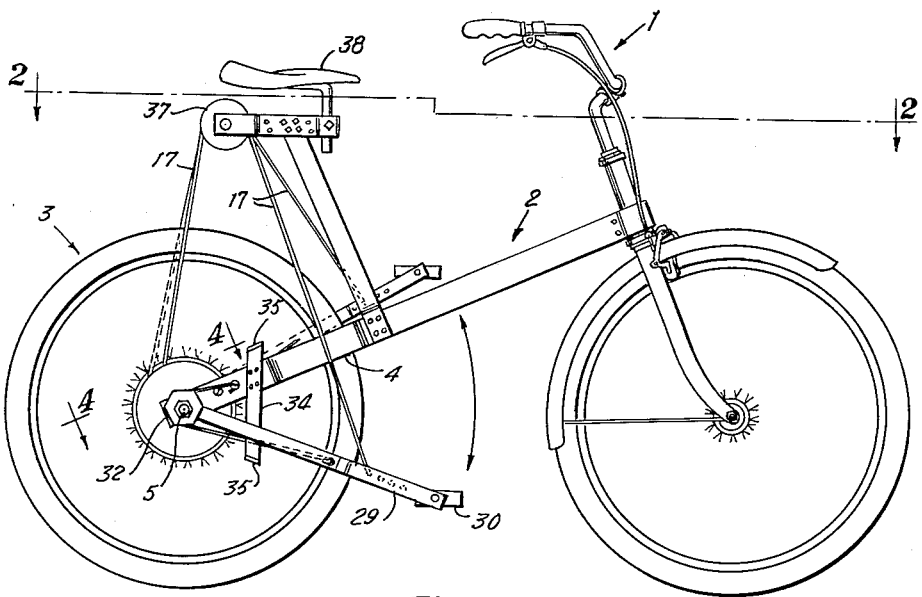
FIGURE 1 is a side elevational view of a bicycle embodying the invention.
Figure 2:
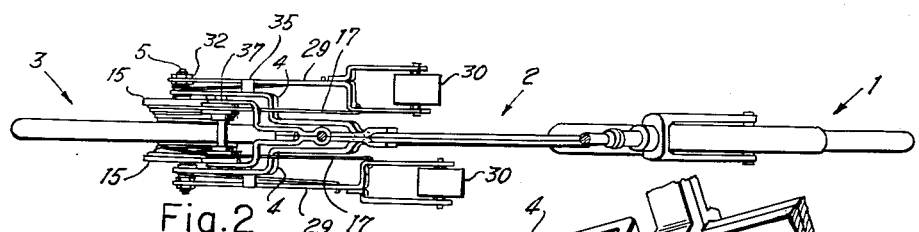
FIGURE 2 is a sectional plan view taken on the line 2—2 of FIGURE 1.
Figure 3:
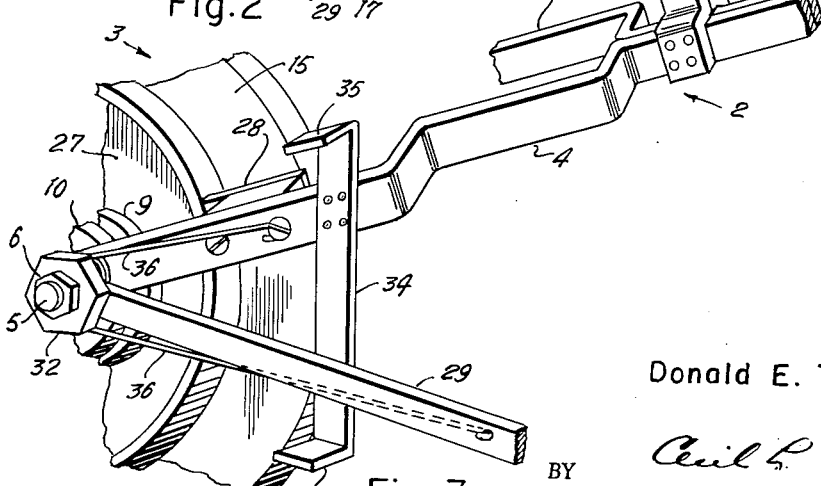
FIGURE 3 is a fragmentary perspective view, on an enlarged scale, showing a portion of the apparatus illustrated in FIGURE 1.

Referring to FIGURES 1 to 7 of the drawing, the numeral 1 designates generally a bicycle embodying the invention. The bicycle 1 has a frame 2, which may be of any suitable construction. As shown, the frame 2 is fabricated of metal bars, preferably aluminum. A driving wheel 3, which comprises the rear wheel of the bicycle 1, is rotatably mounted on the frame 2. The frame 2 has a rearwardly extending fork 4 which embraces the driving wheel 3.

A shaft 5, which forms an axle for the driving wheel 3, extends through openings therefor in the rear end of the fork 4. The shaft 5 is threated at its ends, and has nuts 6 applied thereto. A sleeve 7, which is rotatable with the driving wheel 3, surrounds the shaft 5 intermediate its ends. The sleeve 7 is threaded externally at its ends, and has internally threaded race rings 9 applied thereto. The race rings 9 coact with a pair of race rings 10, which surround the shaft 5 and are positioned between the respective race rings 9 and the adjacent sides of the fork 4, to provide races in their opposed surfaces for ball bearings 11 whereby the sleeve 7 is rotatably supported on the shaft 5.

The driving wheel 3 has a hub 12, and spokes 13 which extend radially outwardly from the hub 12. A pair of bushings 14, which are inserted in opposite ends of the hub 12 and are rotatable therewith, are keyed to the sleeve 7 whereby the bushings 14 and the wheel 3 are rotatable with the sleeve 7.

A pair of drums 15, which surround the sleeve 7 and are positioned on opposite sides of the wheel 3, are rotatably supported on the sleeve 7, whereby the drums 15 are rotatable independently of the wheel 3.

The drums 15 are frusto-conical, and have helical grooves 16 in the tapered sides thereof for frictional engagement by cables 17, which are wound on the respective drums 15 and are secured thereto at one end, whereby the drums 15 are adapted to be rotated relative to the sleeve 7 upon pulling the free ends of the cables 17, whereby the cables 17 are unwound from the drums 15. The cable 17 is wound on the conical drum so that it first unwinds off the largest diameter portion of the conical drum at the beginning of the pedal stroke.

Figure 4:
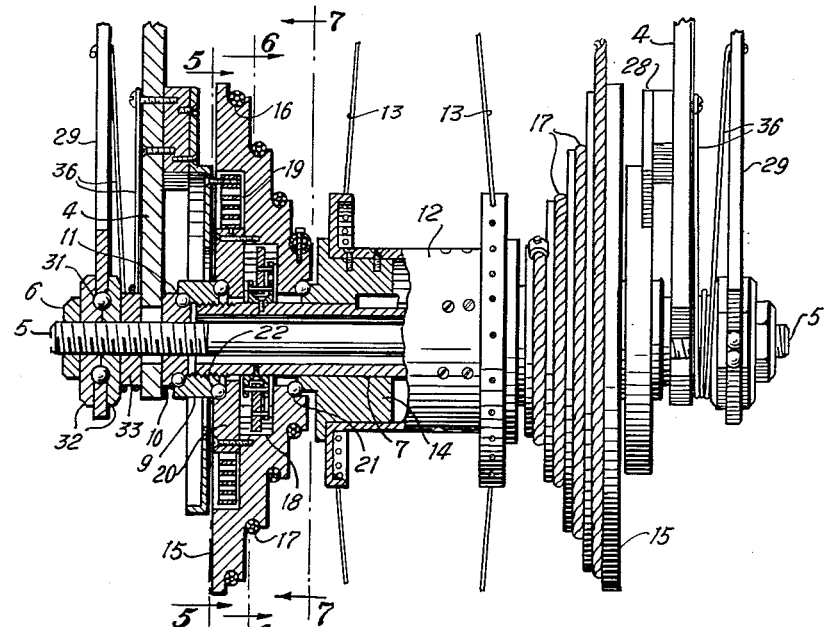
FIGURE 4 is a fragmentary transverse view, on an enlarged scale, partly in section taken on the line 4—4 of FIGURE 1.

Circular recesses 18 and 19 are formed in the sides of the drums 15 opposite the grooves 16, centrally thereof and the recesses 18 are concentric within the recesses 19, as shown in FIGURE 4. A pair of annular members 20, which surround the sleeve 7, are disposed within the annular depressions 19, centrally thereof, and form partial closures for the circular recesses 18. Marginal portions of the annular members 20 are secured to opposed surfaces of the drums 15, whereby the annular members 20 are rotatable with the drums 15, which are rotatably supported on ball bearings 21, disposed in races provided therefor in opposed surfaces of the bushings 14 and the drums 15, and the annular members 20 are rotatably supported on ball bearings 22, which are disposed in races provided therefor in opposed surfaces of the race rings 9 and the annular members 20.

Figure 6:
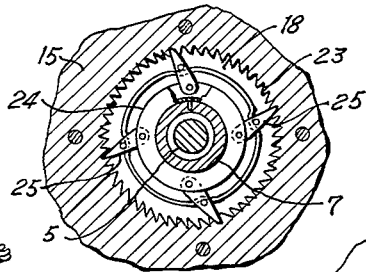
FIGURE 6 is a sectional elevational view taken on the line 6—6 of FIGURE 4.
Figure 5:
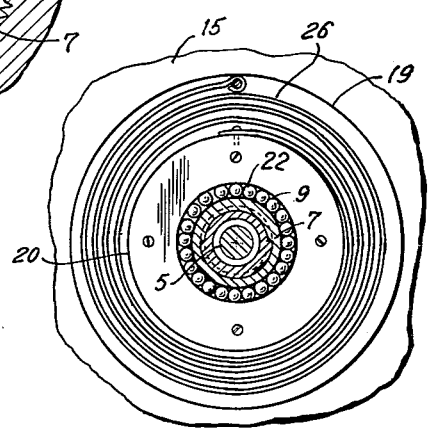
FIGURE 5 is a sectional elevational view taken on the line 5—5 of FIGURE 4.
Figure 7:
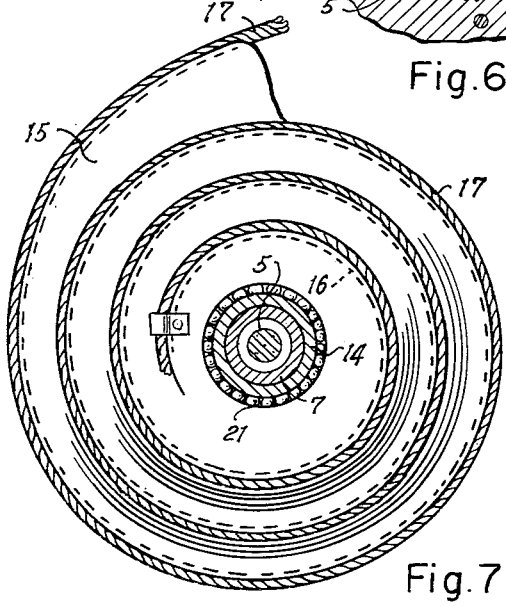
FIGURE 7 is a sectional elevational view taken on the line 7—7 of FIGURE 4.

The inner surfaces of the circular recesses 18 are serrated, as at 23, and rings 24, which surround the sleeve 7 and are rotatable therewith, have circumferentially spaced pawls 25 thereon for abutting engagement with the serrated surfaces 23 causing rotation of the drums 15 relative to the sleeve 7 in one direction only, the serrations forming ratchet teeth, as illustrated in FIGURE 6.

Coil springs 26, which are disposed within the annular depressions 19, surrounding the annular members 20, are connected at their inner ends to the annular members 20. Annular plates 27, which surround the sleeve 7 and are positioned immediately adjacent the drums 15, in concentrically spaced relation to the race rings 9, have ears 28 extending radially outwardly therefrom which are rigidly connected to the fork 4.

The outer ends of the springs 26 are connected to the annular plates 27, whereby the drums 15 are yieldably restrained against rotation relative to the frame 2, and the cables 17 are adapted to be rewound on the drums 15 by the action of the springs 26. The arrangement is such that the wheel 3 is adapted to be rotated in a forward direction only upon pulling the free ends of the cables 17, or either of them. The tension of the springs 26 can be increased or decreased by rotating the plates 27.

A pair of foot operable levers 29, which have pedals 30, are pivotally connected to opposite ends of the shaft 5. The connected ends of the levers 29 are journaled on ball bearings 31, which are operable in races formed in opposed surfaces of race rings 32 surrounding the shaft 5. The race rings 32 are spaced apart from the fork 4 by spacer elements 33.

A pair of vertically disposed bars 34, which are rigidly connected intermediate their ends to the fork 4, forwardly of the shaft 5, have angularly bent end portions 35 for abutment against the levers 29 to limit pivotal movement thereof in either direction. Wire springs 36, which are coiled about the spacer elements 33 and connected at their ends to the fork 4 and the levers 29, act on the levers 29 to resist downward pivotal movement thereof, whereby the levers 29 are normally biased in their uppermost positions.

A pair of pulleys 37 are mounted on an upper portion of the frame 2, below the seat of the bicycle 1, indicated by the numeral 38, and rearwardly thereof. The pulleys 37 are positioned substantially above the drums 15. The cables 17 are strung over the pulleys 37, and the free ends thereof are connected to the levers 29, whereby vertical reciprocating motion applied to the free ends of the levers 29 results in rotative movement of the drums 15.

Referring to FIGURES 8 to 12, a pair of drums 39, which correspond to the drums 15 shown in FIGURES 1 to 7, comprise irregularly shaped annular elements, the peripheral surfaces of which are continuously curved about progressively increasing radii to form radially outwardly extending abutments 40 on one side thereof. Lengths of chain 41, which are substituted for portions of the cables 17, are wound on the drums 39. The inner ends of the chains 41 are connected by tension springs 42 to the abutments 40.

The drums 39 loosely surround the sleeve 7, and have radially inwardly extending bearing surfaces 43 and 44 on opposite sides thereof for frictional engagement with the sleeve 7. The bearing surfaces 44 are pivotally connected at one end to links 45, which are pivotally connected at their opposite ends to the drums 39, whereby the bearing surfaces 44 are adjustable radially relative to the sleeve 7. Levers 46, which are pivotally connected intermediate their ends to the drums 39 opposite the bearing surfaces 44, are pivotally connected at one end to elongated pins 47 which extend transversely through the chains 41 adjacent their inner ends. The inner ends of levers 46 are bent to give increased radial inward thrust with continuation of movement of the chains 41 away from abutments 40 to allow for wear of bearing surfaces 43 and 44. This arrangement is shown in FIGURES 10 and 12.

Upon tightening the chains 41 about the drums 39, the ends of the levers 46 opposite the pins 47 are caused to frictionally engage the bearing surfaces 44, whereby the sleeve 7 is rotatable with the drums 39. Discs 48, which loosely surround the sleeve 7, and are positioned immediately adjacent the drums 39, have openings therein through which the pins 47 are passed, whereby the discs 48 are rotatable with the drums 39. Coil springs 49, which are positioned on the sides of the discs 48 opposite the drums 39, surround the sleeve 7 and have their inner ends connected to the ends of the pins 47 opposite the chains 41. The discs 48, which are positioned between the chains 41 and the springs 49, serve as guides for the adjacent sides thereof.

After the chains are unwound from the drums 39 and the pull is released, the coil springs 49, acting on pins 47, first helps springs 42 return the levers 46 to inoperative positions frictionally against bearing surfaces 44 and 43. As soon as this friction pressure is released the coil springs 49 rewind the chains 41 on the drums 39. Thus the chains 41 will be rewound through any portion of a stroke immediately as and when the pull on the chain 41 is released.

Annular plates 50, which have peripheral flanges 51, are positioned on the sides of the springs 49 opposite the discs 48, and serve as guides for the adjacent sides thereof. The annular plates 50 correspond to the annular plates 27 shown in FIGURES 1 to 7, and have ears 52 whereby they are rigidly secured to the fork 4. Annular plates 50 may be rotated to adjust the return spring tension.

The outer ends of the springs 49 are connected to the peripheral flanges 51 of the annular plates 50, whereby the drums 39 and the discs 48 are yieldably restrained against rotation relative to the frame 2.

It is contemplated that the chains 41 may be formed of uniform links having greater or lesser dimensions as to thickness in order to produce the desired leverage as the chains are unwound from the drums 39. Obviously the change in leverage will increase or decrease in accordance with the thicknesses of the links of the chains 41 and thus affect the speed of rotation of the sleeve 7 and the wheel 3.

It is apparent that as the cables 17 are unwound from the drums 15 the latter will rotate with increased speed since the radii of the spiral grooves 16 constantly decrease toward the axis of the drums 15. The rate of acceleration in speed may be increased or decreased by changing the rate of change of the radii of the spiral grooves 16.

A particular design of conical drum or a particular thickness of chain results in a constantly changing effective leverage or torque applied to the drive wheel and allows the rider to select the leverage or speed desired at a particular time by merely operating the foot levers over that portion of their stroke that causes the flexible linkage to unwind through that portion of the drum rotation having the desired leverage or speed ratio.

The invention may be modified in various ways without departing from the spirit and scope thereof.

What is claimed is:

1. In a bicycle having a frame and a traction wheel on said frame having a hub and a stationary axle shaft, a sleeve rotatably embracing said axle shaft and having a rigid connection with said hub and extending beyond the ends thereof, a foot-actuated lever pivotally mounted at one end on each end of said axle shaft, each of said levers having a pedal on its free end, a spring-loaded drum rotatable on each end of said sleeve adjacent the ends of said hub, a cable wound about each of said drums and having one end attached thereto, the free ends of said cables being attached to the free ends of said levers, a clutch device in each drum providing a driving connection between said drum and said sleeve to rotate the latter when said pedals are alternately operated, and a spring on the pivot of each lever normally biasing the latter to its upper position.

2. A bicycle structure having a frame and wheels, one of said wheels providing traction and having a hub, a stationary axle shaft for said wheel, a sleeve rotatably mounted on said axle shaft and having a rigid connection with said hub and extending beyond the ends thereof, a foot-actuated lever on each side of said frame pivoted at one end to each end of said axle shaft and having foot pedals on their opposite ends, a pair of spring-loaded drums rotatably mounted on said sleeve, one at each end thereof adjacent the ends of said hub, a cable wound on each drum and having one end secured to said drum whereby to rotate said drum when said cable is unwound, the free ends of said cables being attached to the free ends of said levers, a clutch device in each drum connecting the same to said sleeve when the drum is rotated by said cable in one direction, and springs on the pivots of said levers normally urging the same to their upper positions.

3. In a drive mechanism for a bicycle having a frame and a driven wheel in said frame having a hub and an axle shaft, a sleeve on said axle shaft having a rigid connection with said hub, a pair of frusto-conical drums oppositely arranged axially of said wheel on each end of said sleeve and a clutch mechanism in each drum permitting rotation thereof in one direction only, a spiral groove formed in the conical face of each drum, a pair of pulleys in said frame above said drums, a cable wound in each groove having one end fixed to said drum and operating over said pulleys a foot-actuated lever pivoted axially of each drum and having the free ends of said cables connected thereto whereby to unwind said cables from said drums when said levers are operated, and springs in said drums rotating the same counter to the direction of rotation thereof by said levers.

References Cited in the file of this patent

UNITED STATES PATENTS

| 1,588,876 | Curtiss | June 15, 1926 |
| 2,630,333 | Petersen | Mar. 3, 1953 |

FOREIGN PATENTS

| 504,282 | France | Apr. 9, 1920 |
| 947,858 | Germany | Aug. 23, 1956 |